United States Patent [19]

Pecukonis et al.

[11] Patent Number: 5,726,504
[45] Date of Patent: Mar. 10, 1998

[54] APPARATUS AND METHOD FOR ADAPTIVELY CANCELING HARMONIC CURRENTS IN A POWER LINE

[76] Inventors: Joseph P. Pecukonis, 8255 S. Poplar Way, #102, Englewood, Colo. 80112; Ovel Emerson, 1500 W. Thornton Pkwy., #85, Thorton, Colo. 80221

[21] Appl. No.: 653,290

[22] Filed: May 24, 1996

[51] Int. Cl.$^6$ ........................................ H02J 3/01
[52] U.S. Cl. ................................. 307/105; 363/39
[58] Field of Search ........................ 307/105; 364/149, 364/176, 483; 363/39, 44–48; 318/795; 340/660; 324/107; 333/12, 167–176; 323/205–208

[56] References Cited

U.S. PATENT DOCUMENTS

| | | | |
|---|---|---|---|
| 4,565,958 | 1/1986 | Cooper . | |
| 5,063,532 | 11/1991 | Takeda et al. . | |
| 5,138,247 | 8/1992 | Tanoue et al. | 323/207 |
| 5,287,288 | 2/1994 | Brennen et al. | 364/483 |
| 5,298,888 | 3/1994 | McEachern et al. | 364/483 |
| 5,309,353 | 5/1994 | Schauder et al. | 363/39 |
| 5,567,994 | 10/1996 | Davis et al. | 307/105 |
| 5,568,371 | 10/1996 | Pitel et al. | 363/39 |

OTHER PUBLICATIONS

Richard Petrecca and Nicholas Abi–Samra; "Active Power Line Conditioning: A New Approach to Power Quality"; Power Quality Assurance, Jul./Aug. 1993; pp. 10–13.

Gerald Jacob; "Power Factor Correction Requirements Impact UPS" EE–Evaluation Engineering, Dec. 1993; pp. 35–39.

Sam C. Yakulis; "Resonant Energy Storage Device Eliminates Harmonics"; Power Quality, Apr./Jun. 1992.

Brochure; Georator Series 100 GeoSine Harmonic Line Conditioner 60Hz/50Hz.

Brochure; Georator Series 104 GeoSine Harmonic Line Conditioner 480 Volt 60 Hz 3 Phase Delta.

Advertisement from Consulting–Specifying Engineer, Oct. 1993 for IPM's Software Harmonic Conditioner; pp. 259–261.

Advertisement from Power Quality Assurance, Jan./Feb. 1994 for Goerator GeoSine Harmonic Line Conditioner.

*Primary Examiner*—Richard T. Elms
*Attorney, Agent, or Firm*—John R. Ley

[57] ABSTRACT

An active power line conditioner that removes or cancels harmonic currents in power lines. The active power line conditioner is used with a power distribution system. The power distribution system includes an A/C source which supplies alternating half cycles (A/C) of voltage and current through a power line to an electrical load. An electrical load draws harmonic frequency current from the power line. The active power line conditioner comprises a current sensor, a first template circuit, a comparison circuit, and a current absorption and supply circuit. The current sensor is coupled to the power line and has an output comprising a sensed current signal representative of the current in the power line. The first template circuit has an output comprising a preferred current template that represents a desired sinusoidal current at the fundamental frequency of the power line and which is free of harmonic components. The comparison circuit is responsive to the preferred current template and the sensed current signal and has an output comprising a comparison signal that is indicative of whether the preferred current template is greater than or less than the sensed current signal. The current absorption and supply circuit is connected to the power line and alternates between supplying current to the power line and drawing current from the power line in response to the comparison signal to substantially cancel the harmonic frequency current in the power line.

28 Claims, 7 Drawing Sheets

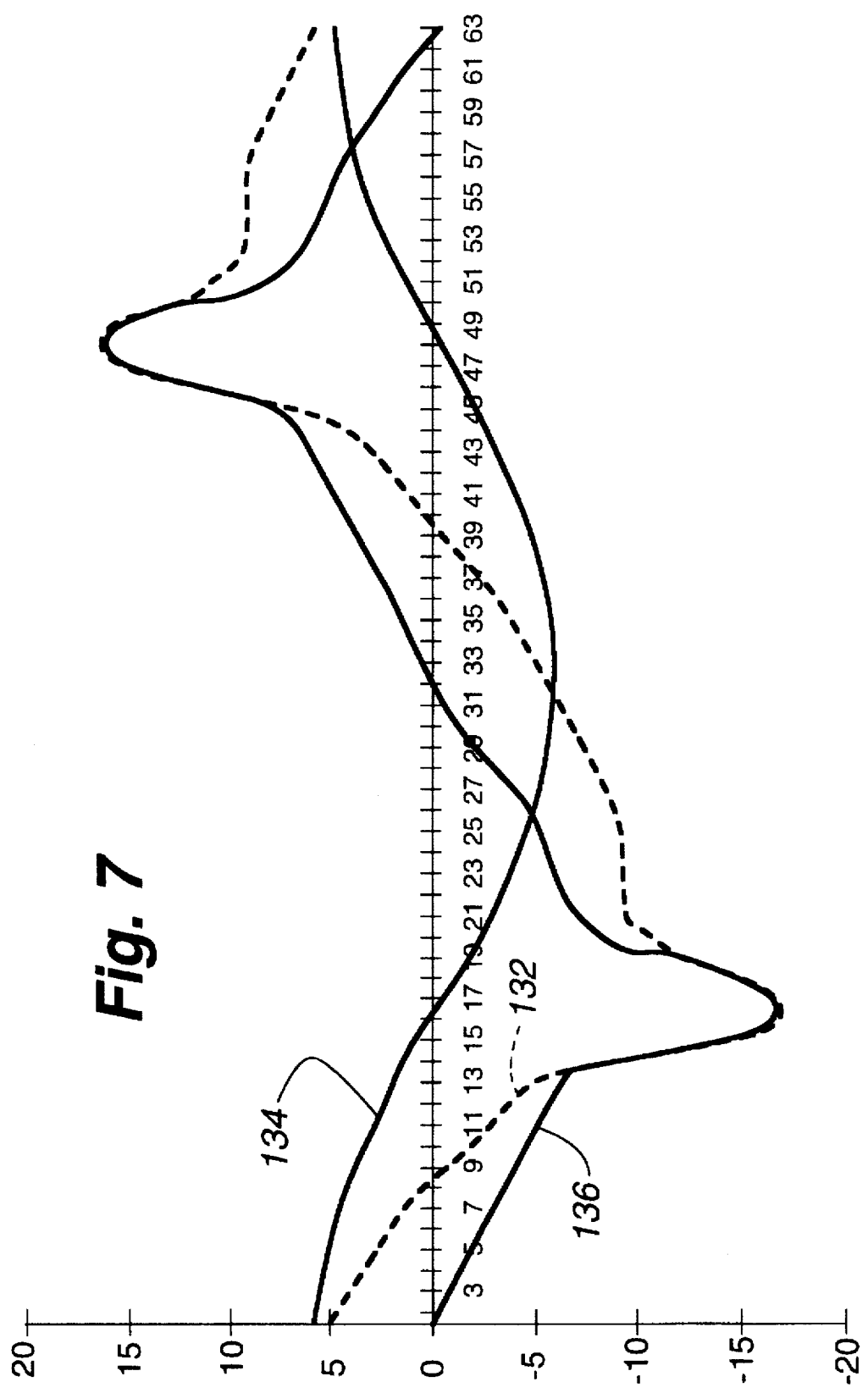

APPARATUS AND METHOD FOR ADAPTIVELY CANCELING HARMONIC CURRENTS IN A POWER LINE

FIELD OF THE INVENTION

This invention relates to the elimination and reduction of undesirable and potentially dangerous harmonic current conducted in commercial power lines or mains. More particularly, this invention relates to conducting predetermined signals into or from the power line to counteract or actively cancel harmonic frequency currents which would otherwise be present in the power line because of the current conduction characteristics of nonlinear loads connected to the power lines.

BACKGROUND OF THE INVENTION

A serious concern associated with the distribution of power are harmonic currents that are created in the power lines by electrical devices which having an input impedance that appears as a nonlinear load. The nonlinear load typically comprises a switching device, such as a diode or transistor, connected to a capacitive element. Examples of electronic devices that appear as a nonlinear load to a power system include switching power supplies, microprocessor-based controllers, adjustable speed motors, and electronic ballast fluorescent lamps. Nonlinear load devices create harmonic currents when they draw repetitive high peak currents from the power line. Harmonic currents can cause substantial harmonic distortion of a supplied sinusoidal line voltage. Consequently, sensitive electrical equipment, which relies on a supply of pure sinusoidal voltage from the power line, can operate erratically or fail in the presence of harmonic currents.

The harmonic currents have deleterious effects in conventional three-phase, four-wire power distribution systems. Three phase power distribution systems include a three phase transformer (e.g. such as a delta-wye circuit) that converts three phase voltage from main power lines to a single phase voltage that is then distributed on three power line branches. When nonlinear loads are not present on the power line branch, current in the three phases are relatively displaced 120 degrees and cancel each other in a neutral or common conductor in the transformer. In contrast, when nonlinear loads are present, the harmonic current that is drawn by the nonlinear loads does not cancel with the current in the other power line branches. The non-canceled current is conducted through the neutral conductor where it can cause substantial heating of the neutral and can cause additional power consumption from the power system.

Transformers in the power system are optimized for power efficiency at the fundamental frequency of the power delivery system. The harmonic currents, which can have relatively high frequency components, cause increased eddy currents in the core of the transformer. The eddy currents increase the temperature of the transformer, with an associated substantial decrease in its reliability, and further consume additional power from the power system.

One effort addressed at minimizing harmonic currents in power lines has been the adoption and implementation of product performance standards which seek to limit the amount of harmonic current that electrical devices can introduce into power lines. Such standards may be voluntarily complied with by industry organizations, such as the Institute of Electrical and Electronic Engineers, or such standards may be mandatorily imposed by governmental regulatory authorities, such as the International Electrotechnical Commission.

One technical approach to reducing the harmonic current is the use of harmonic filters. Passive and active harmonic filters are connected to or made a part of the nonlinear electrical load devices to remove harmonic distortion. When a filter is added in series with an electrical device, power to the device must be interrupted while the filter is installed. The reliability of the electrical device is reduced since a failure of the filter can result in a permanent interruption of power to the device. The filter must be rated to handle the peak combined current of the electrical device since current flows through the filter to the series connected electrical device. In electrical devices which draw high current, a large filter is required, and the cost, size, and weight of the filter may be substantial.

Passive harmonic filters are highly load dependent with their filtering characteristics being optimized for removing harmonic distortion having a predetermined frequency and magnitude. However, the harmonic distortion can vary substantially over time as electrical devices are added or taken out of service and as electrical devices are operated in varying modes, thereby limiting the capability of passive filters to achieve acceptable levels of harmonic current filtering.

It is with respect to these and other considerations that the present invention has evolved.

SUMMARY OF THE INVENTION

The present invention is directed to an active power line conditioner that is used with a power distribution system of the type that includes an A/C source which supplies alternating half cycles (A/C) of voltage and current through a power line to an electrical load. An electrical load draws harmonic frequency current from the power line. The active power line conditioner comprises a current sensor, a first template circuit, a comparison circuit, and a current absorption and supply circuit.

The current sensor is coupled to the power line and has an output comprising a sensed current signal representative of the current in the power line. The first template circuit has an output comprising a preferred current template that represents a desired sinusoidal current at the fundamental frequency of the power line and which is free of harmonic components. The comparison circuit is responsive to the preferred current template and the sensed current signal and has an output comprising a comparison signal that is indicative of whether the preferred current template is greater than or less than the sensed current signal. The current absorption and supply circuit is connected to the power line and alternates between supplying current to the power line and drawing current from the power line in response to the comparison signal to substantially cancel the harmonic frequency current in the power line.

In further embodiments of the present invention, the current sensor is connected between a neutral conductor of the power line and a ground conductor of the power line to sense at least the harmonic current in the neutral conductor. Connecting the current sensor and the current absorption and supply circuit to the power line in this manner enables the line conditioner to be connected to the power line entirely through a conventional power outlet.

The line conditioner is further adapted to be connected to the power line in parallel with the electrical load. The parallel connection enables the line conditioner to be installed, turned off, or experience an operational failure without interrupting power to the load. The capacity of the line conditioner to substantially cancel harmonic current in the power line can be scaled to the requirements of a location, such as an office building, by connecting line conditioners to power outlets distributed throughout the location.

The line conditioner generates a phase shifted current template which it uses to remove current from the sensed current signal that is phase shifted relative to the voltage in the power line. The phase shifted current that is removed can include inductive current that lags the line voltage by 90 degrees. Consequently, the line conditioner does not attempt to cancel phase shifted current in the power line.

The current absorption and supply circuit supplies current to the power line when the comparison signal indicates that the magnitude of the sensed current signal is greater than the magnitude of the preferred current template. Similarly, the current absorption and supply circuit draws current from the power line when the comparison signal indicates that the magnitude of the sensed current signal is less than the magnitude of the preferred current template. The current absorption and supply circuit increases the amount of current it supplies to the power line or draws from the power line by a predetermined amount in each consecutive cycle in which the comparison signal indicates that the magnitude of the sensed current is greater than or less than, respectively, than the preferred current template. In this manner, the current that is supplied to and drawn from the power line is ramped-up to a magnitude that substantially cancels the harmonic current. Ramping the current by incremental amounts in each half cycle enables the line conditioner to adapt, in a stable manner, to time varying harmonic current.

The current absorption and supply circuit includes an energy storage device and a bridge circuit that is connected between the energy storage device and the power line. The energy storage device is charged to draw current from the power line and is discharged to supply current to the power line. The bridge circuit is responsive to a positive half cycle of voltage in the power line to connect the energy storage device to the power line in a first polarity relationship between the voltage in the energy storage device and the voltage in the power line and is responsive to a negative half cycle of voltage in the power line to connect the energy storage device to the power line in the first polarity relationship.

A more complete appreciation of the present invention and its scope can be obtained by reference to the accompanying drawings, which are briefly summarized below, the following detailed description of presently preferred embodiments of the invention, and the appended claims.

BRIEF DESCRIPTION OF THE DRAWINGS

FIG. 7 is a waveform diagram of a phase shifted current in the power line branch shown in FIG. 1 and a phase shifted current template generated by the line conditioner shown in FIG. 1.

DETAILED DESCRIPTION

Figure 1:
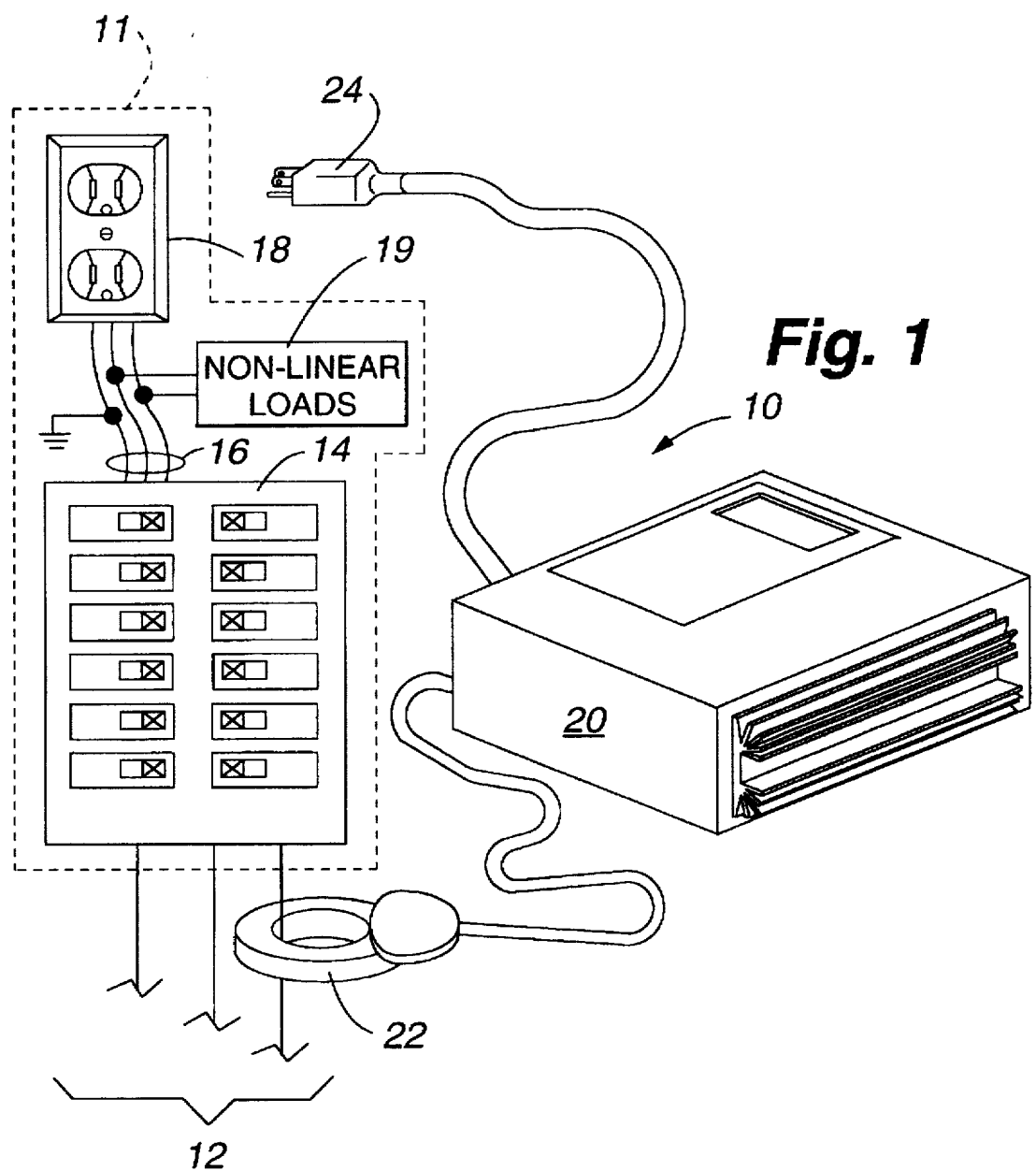
FIG. 1 is a perspective view of a line conditioner according to an embodiment of the present invention that illustrates connection of the line conditioner to one phase of a main power line branch at a conventional circuit breaker box and to a single phase branch of the main power line at a conventional wall socket and in parallel with nonlinear loads.

A line conditioner 10 embodying the present invention is shown in FIG. 1. The line conditioner 10 is adapted to connect to a conventional power distribution system 11. Conventional power in the form of three phase alternating cycle (A/C) current and A/C voltage is supplied over main power lines 12 of a single phase branch of a power distribution system. The A/C current and A/C voltage are supplied as sinusoidal waveforms having a fundamental frequency of typically 50 Hz or 60 Hz. The main power lines 12 conduct the power to a plurality of conventional circuit breakers 14. Each circuit breaker 14 distributes the power over single phase power line branches 16 to conventional power outlets 18.

Nonlinear loads 19 are typically connected to the circuit power line branches 16. The nonlinear loads 19 may either be permanently connected to each circuit branch 16, as shown in FIG. 1, or may be connected at the power outlet 18. The nonlinear loads 19 draw current from the circuit branch 16 in surges that are non-sinusoidal and/or sinusoidal with frequency components that are different from the fundamental frequency of current in the main power lines 12. The effect of the nonlinear loads 19 is to create a harmonic current waveform (curve 30 in FIG. 2A) having harmonic frequency components in the circuit branch 16 and single phase branch 12.

Figure 5:
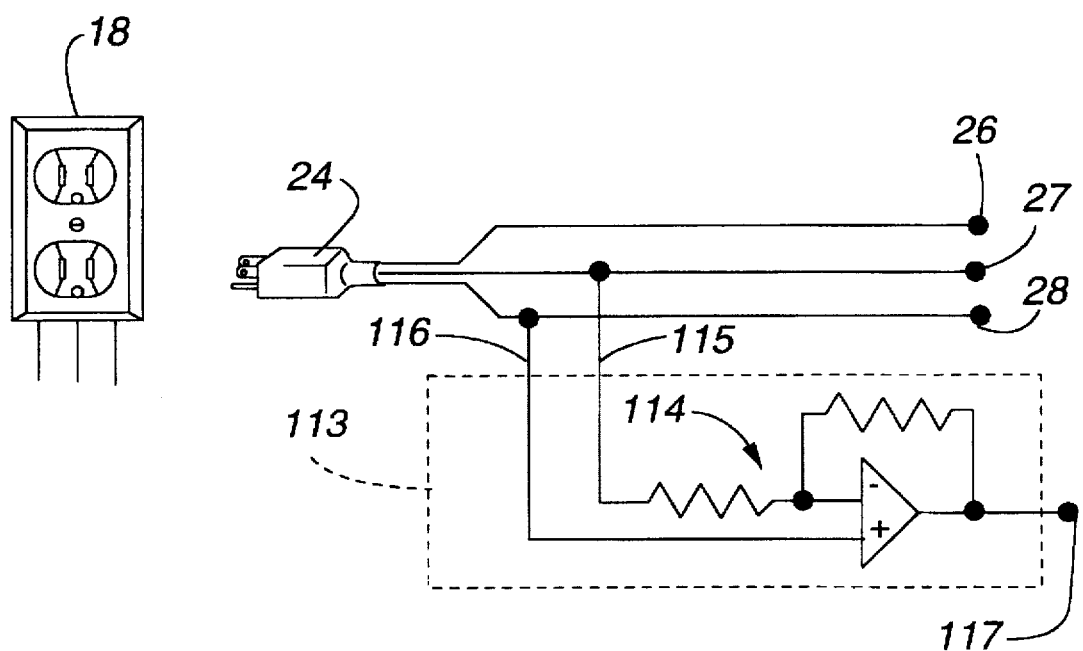
FIG. 5 is a schematic diagram of an alternate embodiment of the current sensor in FIG. 3.

The line conditioner 10 connects to the power distribution system 11 and conducts signals into or from the distribution system 11 at the circuit branch 16 to counteract or actively cancel the harmonic current that would otherwise be present. The line conditioner 10 includes active power conditioner circuitry 20, a current sensor 22, and a plug 24. The plug 24 comprises a conventional energized or "hot" conductor 26, a conventional neutral or unenergized conductor 27, and a conventional ground conductor 28 (as shown in FIG. 5 that are adapted to be electrically connected to the corresponding conductors of a conventional power outlet 18.

The current sensor 22 is adapted to be magnetically coupled to one of the main power lines 12 to sense one phase of the current. The current sensor 22 conducts a signal (curve 30 in FIG. 2A) representative of the current in one phase of the main power lines 12 to the circuitry 20. In a setup mode, the circuitry 20 transmits a tracer signal (i.e. any signal having predetermined identifiable characteristics) through the plug 24 into the line branch 16 to assist a user in determining which one of the main power lines 12 to connect the current sensor 22. A user sequentially connects the current sensor 22 to different ones of the main power lines 12 until the circuitry 20 detects the tracer signal and notifies the user of a proper connection.

The circuitry 20 responds to the harmonic components of the current in the main power lines 12, as sensed by the current sensor 22, by injecting anti-harmonic current through the plug 24 into the circuit branch 16. The anti-harmonic current reduces or eliminates the harmonic current components in the circuit branch 16, leaving only a sinusoidal current at the fundamental frequency (curve 38 in FIG. 2C) in the circuit branch 16 and in the single phase branch 12. Connecting the line conditioner 10 to the circuit branch 16 through the conventional power outlet 18 simplifies installation of the line conditioner 10 and enhances its portability. Furthermore, the capacity of the line conditioner 10 to reduce or eliminate harmonic currents can be easily scaled to meet growing or changing requirements of a location, such as an office building, through the addition of line conditioners 10 to power outlets distributed throughout the location.

Figure 3:
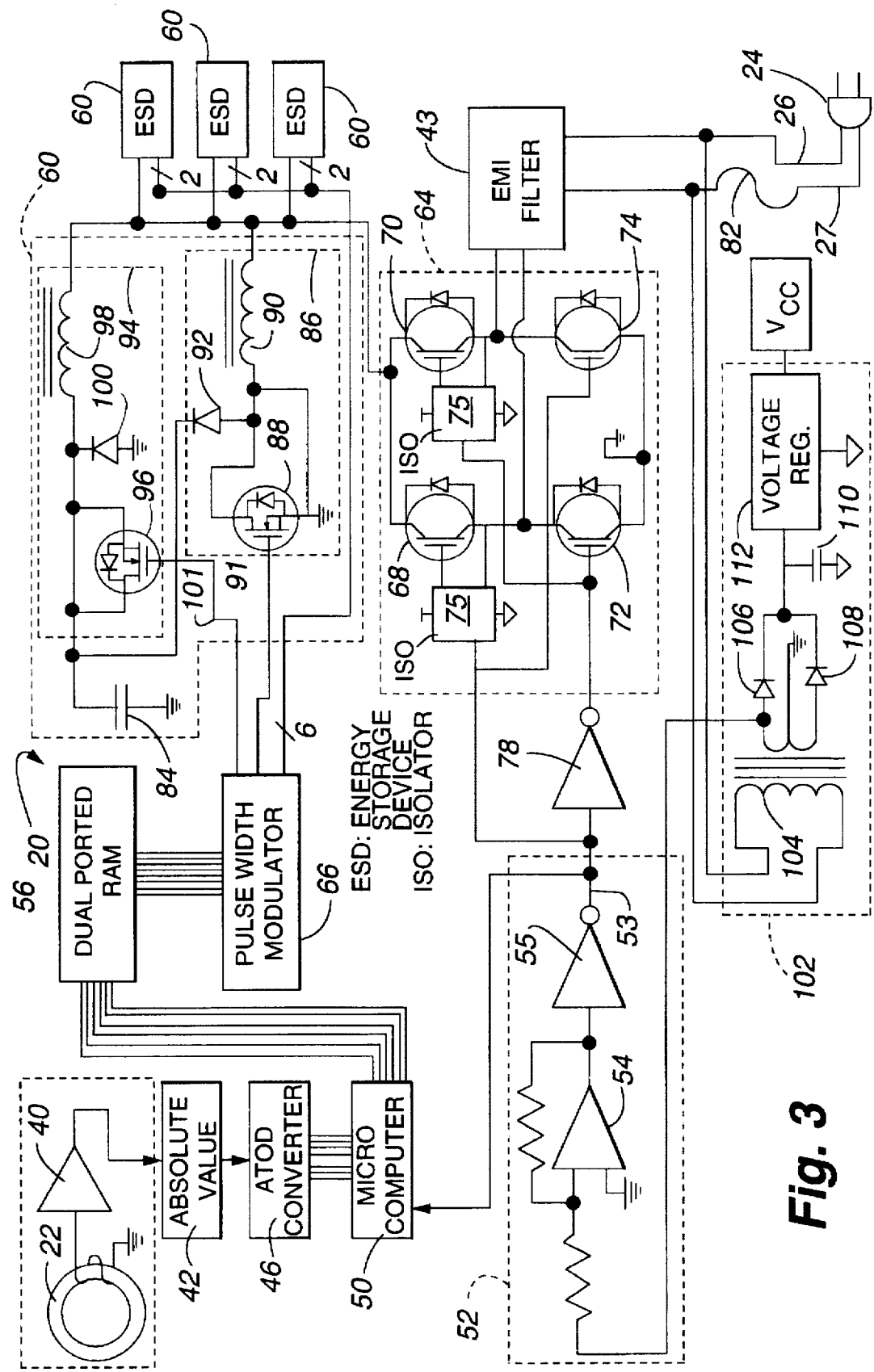
FIG. 3 is a schematic and block diagram of the line conditioner shown in FIG. 1.

Details of a preferred embodiment of the conditioner circuitry 20, which is connected to the plug 24 and the current sensor 22, are shown in FIG. 3.

The current sensor 22 is preferably electromagnetically coupled to one phase of the main power lines 12 (FIG. 1) to generate a small amplitude signal related to the current waveform in the power lines 12 (FIG. 1). The signal is amplified by the amplifier 40, rectified by a conventional absolute value circuit 42, and then digitized by an analog-to-digital converter 46. To accurately sample the current, including the harmonic currents up to the 31st harmonic, the digitized signal is sampled by a microcomputer 50, microcontroller, or sequential logic engine, at a rate of 256 times during each cycle of the current in the main power lines 12 (FIG. 1). Each of the 256 samples is further sub-divided into four samples using interpolation to form 1024 points which represent the harmonic-influenced line current waveform (curve 30 in FIG. 2A).

A zero crossing detector 52 produces a zero crossing signal 53 that indicates when the voltage in the main power line 12 (FIG. 1) crosses zero magnitude. The zero crossing detector 52 is formed from an amplifier 54 that alternates between two binary values as the voltage transitions between positive and negative. An inverter 55 inverts the binary output from the amplifier 54 to produce the zero crossing signal 53 which is supplied to the microcomputer 50. The zero crossing signal 53 triggers the microcomputer 50 to synchronize the restarting of the sampling of the current signal from the current sensor 22 with the beginning of each cycle of the voltage in the main power line 12.

Figure 2:
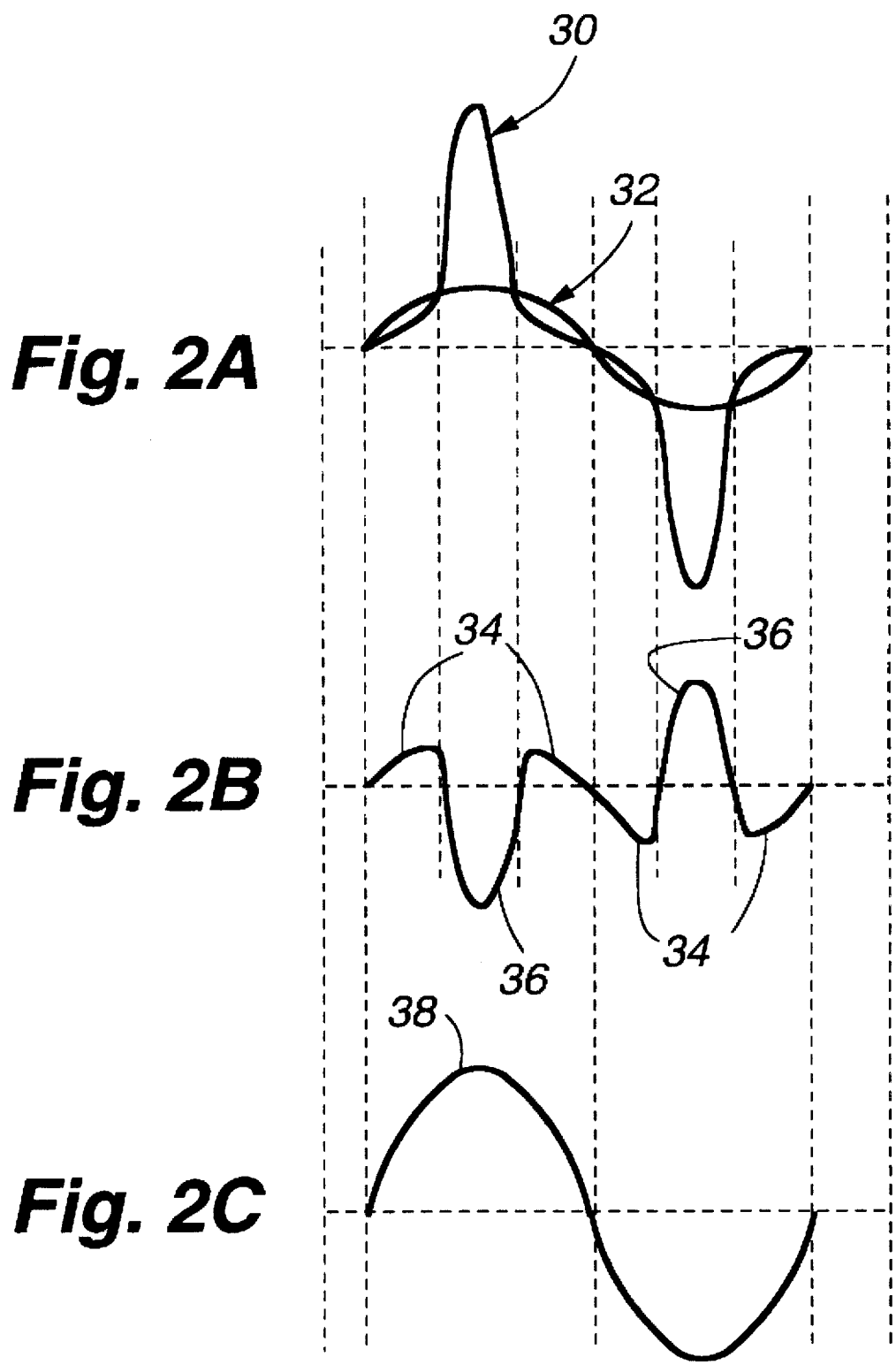
FIG. 2A is a waveform diagram of an exemplary harmonic current in the main power line shown in FIG. 1 and a desired current template of a desired sinusoidal current waveform.
FIG. 2B is a waveform diagram of the anti-harmonic current that is injected into the power line branch by the line conditioner shown in FIG. 1 to substantially cancel the harmonic current.
FIG. 2C is a waveform diagram of the resultant line current in the power line branch shown in FIG. 1 after the harmonic current is canceled by the line conditioner.

As will be described in more detail in connection with FIGS. 5–8, the microcomputer 50 compares the sampled harmonic-influenced line current (curve 30, FIG. 2A) to an internal digital representation of a desired pure sinusoidal-shaped current template (curve 32, FIG. 2A). The desired current template (curve 32, FIG. 2A) has a sinusoidal shape at the fundamental frequency of the current in the main power lines 12. In response to the comparison, the microcomputer 50 develops a table of commands which indicate the magnitude of current that should be drawn from or supplied to the circuit branch 16 to substantially cancel the harmonic current. The microcomputer 50 writes the table to a dual ported RAM 56. A pulse width modulator 66 responds to the table of commands in the RAM 56 to control the magnitude of current that is supplied to and drawn from the circuit branch 16.

The pulse width modulator 66 charges energy storage devices 60 to draw current from the circuit branch 16 and discharges a bank of four energy storage devices 60 to supply current to the circuit branch 16. The four energy storage devices 60 are charged and discharged through a bridge 64 and the hot conductor 26 and neutral conductor 27 of the plug 24. The four energy storage devices 60 are charged or discharged in an interleaved or time-overlapping manner to enable a high level of current to be exchanged with the circuit branch 16.

Figure 4:
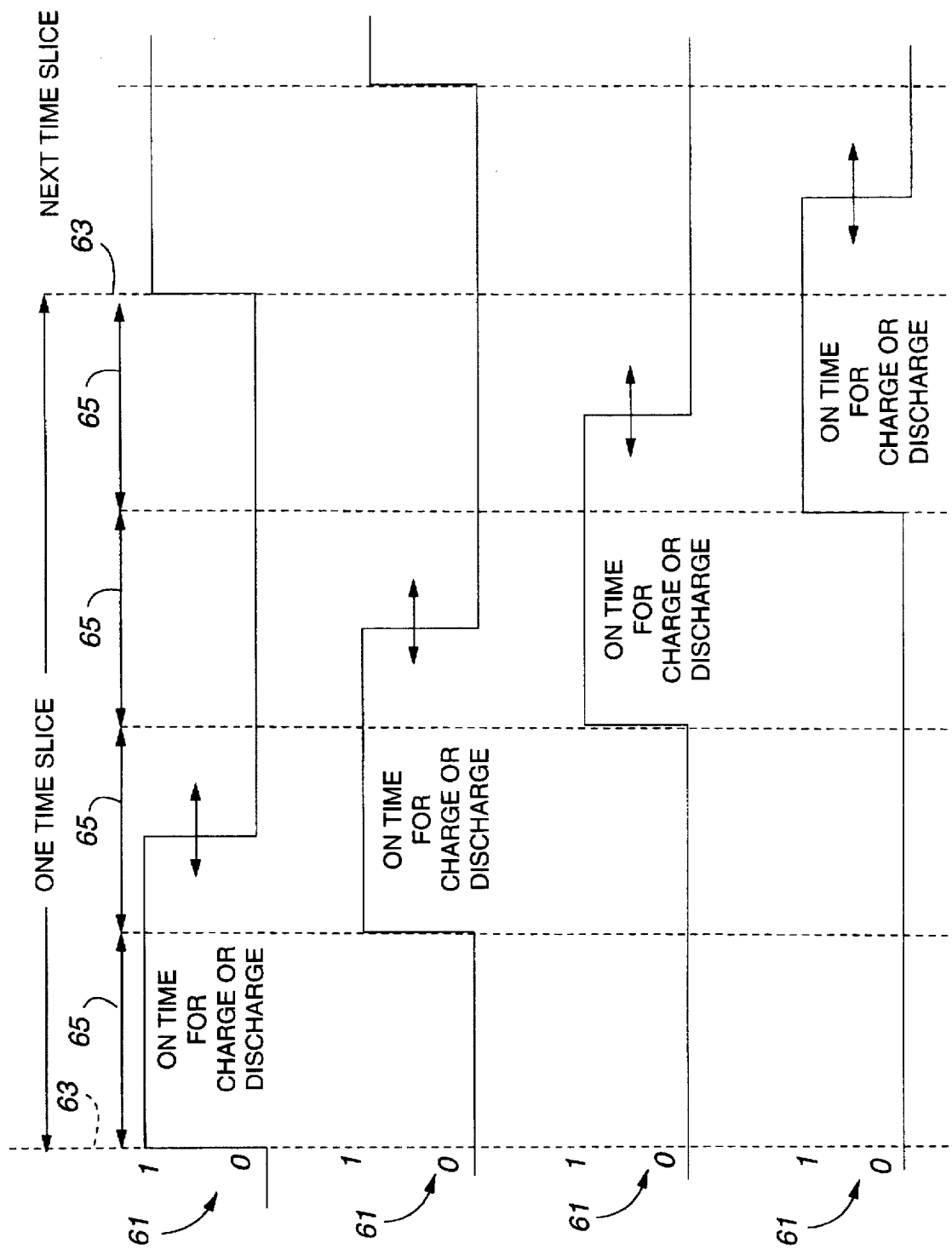
FIG. 4 is a waveform diagram of the charging or discharging of the four energy storage devices shown in FIG. 3.

FIG. 4 shows four timing diagrams 61 on common time axes, with each one of the timing diagrams 61 representing times when a different one of the four energy storage devices 60 is charged or discharged (shown as a logic 1) when it is not charged or discharged (shown as a logic 0). Sample time slices 63 are related to the interval between when the current in the main power lines 12 is sampled. The time duration between the sample time slices 63 is subdivided into four time segments 65. Each of the four time segments 65 corresponds to a different one of the four values that is formed when the microcomputer 50 (FIG. 3) subdivides the sampled current signal. A first one of the four energy storage devices 60 is started charging or discharging at the sample time slices 63. The duration for which the first one of the four energy storage devices 60 is charged or discharged is illustrated by the pulse width of the logic one state in the top one of the timing diagrams 61. The pulse width is controlled by the pulse width modulator 66 (FIG. 3) in response to the pulse width table. Similarly, the other three energy storage devices 60 (FIG. 3) are each sequentially started charging or discharging at the beginning of a different one of the subsequent time segments 65. The duration for which the other three energy storage devices (FIG. 3) are charged or discharged is illustrated by the pulse width of the logic one state in the corresponding timing diagrams. As shown in FIG. 4, between one and four of the energy storage devices 60 can simultaneously be charging or discharging to enable an increased amount of current to be drawn from or supplied to the power line branch 16 (FIG. 1).

The use of four energy storage devices 60 causes noise in the supplied and drawn current to occur at a frequency that is approximately 4 times higher than the fundamental frequency of the current in the circuit branch 16. The noise is substantially removed by an electromagnetic interference (EMI) filter 43 which comprises a highpass filter with a rolloff frequency below the primary frequency of the noise. A fuse 82 limits the maximum current supplied to the plug 24 to protect the conditioner circuitry 20 from conditions such as a short circuit across the plug 24.

The bridge 64 comprises insulated gate bipolar transistors (IGBTs) 68, 70, 72, and 74 and isolators 75. The isolators 75 are formed from transformers (not shown) which boost the voltage of the zero crossing signal 53 to the magnitude of the voltage of the circuit branch 16 (FIG. 1). The zero crossing detector 52 alternately controls one pair of the IGBTs (68 and 74) or (70 and 72) to be conductive while controlling the other pair of the IGBTs (70 and 72) or (68 and 74) to be non-conductive. IGBTs 68 and 74 are switched by the zero crossing signal 53 while IGBTs 70 and 72 are switched by an inverted zero crossing signal from an inverter 78. The zero crossing detector 52 controls the bridge 64 to discharge the energy storage devices 60 in either a positive or negative sense that corresponds to the polarity of the then-present half cycle in the circuit branch 16.

The circuitry of one of the energy storage devices 60 is shown in FIG. 3. A main charge capacitor 84 is charged through a charge circuit 86 that draws current from the circuit branch 16 through the plug 24 and bridge 64. The charge circuit 86 is a conventional boost converter which comprises an inductor 90 connected between the capacitor 84 and the circuit branch 16 and a semiconductor switch 88 (shown as a FET) connected between the inductor 90 and ground. The pulse width modulator 66 supplies a signal 91, having a predetermined pulse width, that switches the semiconductor switch 88 between conductive and nonconductive states. In the conductive state, the semiconductor switch 88 conducts current from the inductor 90 to ground. In the nonconductive state, current flows from the inductor 90 through the diode 92 to the capacitor 84. The duty cycle of the semiconductor switch 88 (i.e. the pulse width of signal 91) varies the duration of current conducted through the inductor 80 and, thereby, the magnitude of the voltage delivered to the capacitor 84. The pulse width modulator 66 switches the semiconductor switch 88 between the conductive and nonconductive states at a duty cycle which establishes a voltage on the capacitor 84 which is greater than the maximum voltage in the circuit branch 16.

Current from the capacitor 84 is discharged through a discharge circuit 94 that supplies the current through the bridge 64 and plug 24. The discharge circuit 94 is a conventional buck converter which utilizes a semiconductor switch 96 (shown as a FET) connected to an inductor 98 and diode 100 to establish a voltage on the plug 24 which is less than the voltage on the capacitor 84. The pulse width modulator 66 supplies a signal 101, having a predetermined pulse width, that switches the semiconductor switch 96 between a conductive and a non-conductive state. The duty cycle of the semiconductor switch 96 (i.e. the pulse width of signal 101) varies the magnitude of the voltage across the inductor 98 and, thereby, the voltage delivered to the plug 24.

Another aspect of the conditioner circuitry 20 is a DC power supply 102 that conducts the A/C voltage from the plug 24 through a step-down transformer 104, a rectifier formed by a pair of diodes 106 and 108 and a capacitor 110, and a voltage regulator 112 that provides a predetermined DC Vcc voltage (e.g. 5V) to the analog-to-digital converter 46, microcomputer 50, RAM 56, and pulse width modulator 66.

In an alternate embodiment of the present invention, the current sensor 22 and the amplifier 40 (FIG. 3) can be replaced with the sensor 113 shown in FIG. 5. The sensor 113 develops a signal representative of the harmonic current in the circuit branch 16 by sensing the current in the neutral conductor. The sensor 113 comprises an amplifier 114 that has an input 115 connected to the neutral conductor 27 of the plug 24 (FIG. 3) and an input 116 connected to the ground conductor 28 of the plug 24. The amplifier 114 has an output 117 that is connected to the absolute value circuit 42 (FIG. 3). The amplifier 114 uses the voltage between the neutral conductor 27 and the ground conductor 28 to generate a signal representative of the harmonic current in the neutral conductor 27, and thereby, the harmonic current in the circuit branch 16. The amplifier 114 delivers the signal representative of the harmonic current to the absolute value circuit 42. Use of the sensor 113 in place of the combination of current sensor 22 and amplifier 40 (FIG. 3) enables the line conditioner 10 to be connected to the power distribution system 11 (FIG. 1) entirely through the power outlet 18 FIG. 1). Consequently, installation of the line conditioner 10 is simplified by avoiding any necessity to connect to a particular phase of the main power lines 12, as was required with the current sensor 22. Furthermore, the costs associated with current sensor 22 and associated tracer circuitry are avoided.

Figure 6:
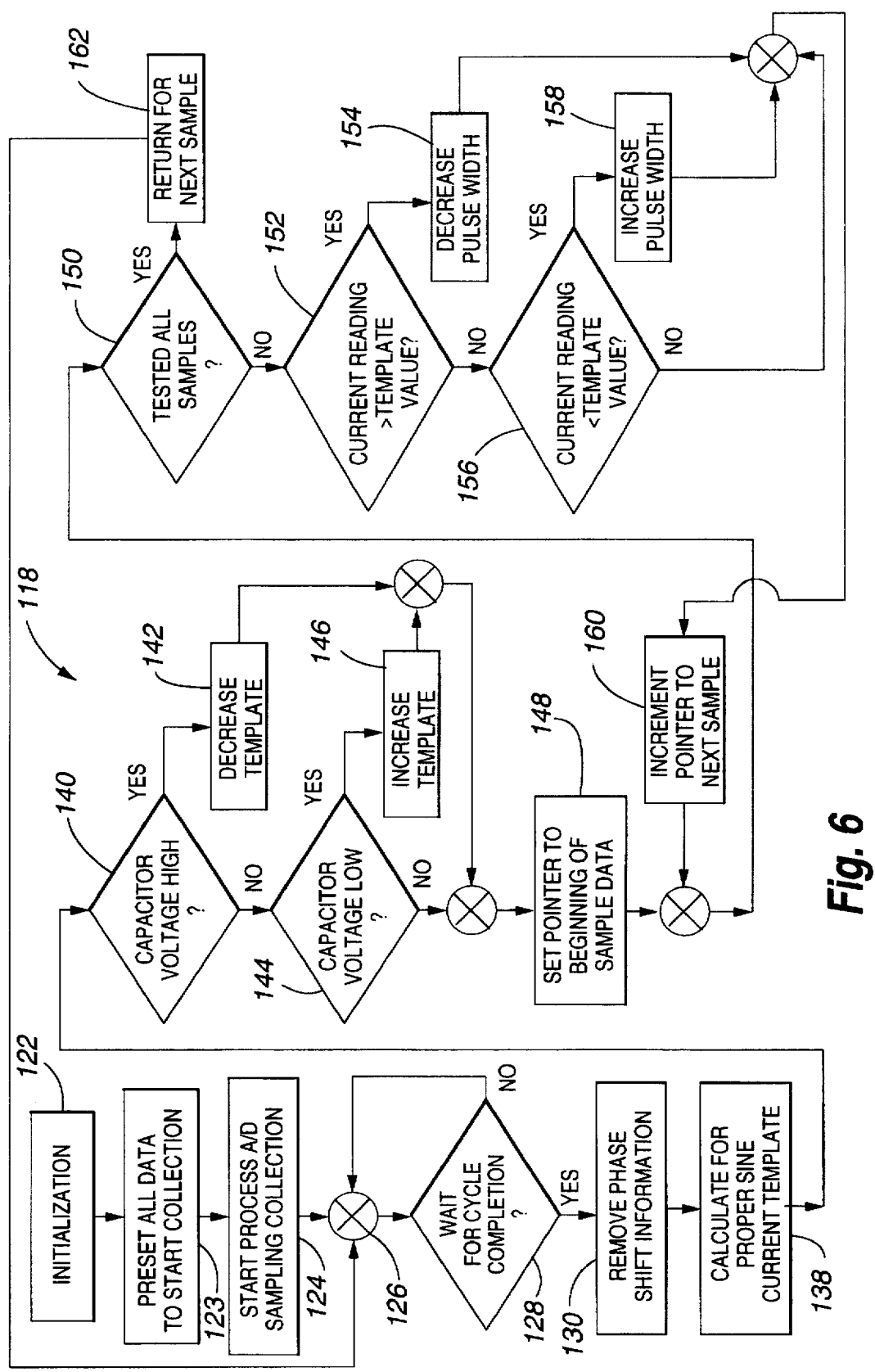
FIG. 6 is a flowchart of the operations performed by a microcomputer of the line conditioner shown in FIG. 3.

FIG. 6 shows the operations that are performed by the microcomputer 50 (FIG. 3) in a main program flow 118 to develop a pulse width table. The pulse width table is subsequently used by the pulse width modulator 66 (FIG. 3) to control the charging and discharging of the energy storage devices 60 to inject anti-harmonic currents into the circuit branch 16 (FIG. 1). The main program flow 118 establishes a closed loop control in which harmonic current in the line branch 16 is iteratively driven to zero or substantially reduced. In particular, the microcomputer 50 (FIG. 3) senses the harmonic current in each cycle of voltage in the main power lines 12 (FIG. 1) and adapts the characteristics of the injected anti-harmonic current to further reduce the harmonic current.

In the main program flow 118, pointers and other variables are initialized at 122. A family of desired current templates is initialized at 123. The family of desired current templates are digital representations of pure sinusoidal signals that have the same frequency as the fundamental frequency of the main power lines 12 (FIG. 1) and have a range of maximum current magnitudes. Also at 123, the pulse width table in the RAM 56 (FIG. 3) is initialized with preselected typical initial starting values. An interrupt timer, which is internal to the microcomputer 50 (FIG. 3), is initialized and enabled for operation at 124. The interrupt timer is initialized to generate at least 256 interrupts in each cycle of voltage in the main power lines 12. In response to each interrupt, a sampling process is executed by the microcomputer 50 which samples and stores in memory the digitized level or value of the current signal which was developed by the current sensor 22 (FIG. 3) and digitized by the analog-to-digital converter 46 (FIG. 3). The values of the sampled current signal are processed in a loop that repeats at 126 to adjust the values in the pulse width table.

At 128, further operations in the main program flow 118 are synchronized by the zero crossing signal 53 (FIG. 3) to the start of a cycle of voltage in the main power line 12. After the start of a voltage cycle, the values of the sampled current profile are processed at 130 to remove any line current components that are phase shifted relative to the line voltage in the connected main power line 12. Relative phase shift between the line current and line voltage is caused by inductive and capacitive components of the nonlinear loads 19 (FIG. 1). An inductive load causes the line current to lag the line voltage by 90 degrees while a capacitive load causes the line current to lead the line voltage by 90 degrees. A line current which lags the line voltage by 90 degrees is illustrated as curve 132 in FIG. 7. The line current (curve 132 in FIG. 7) reaches its maximum magnitude when the line voltage reaches zero magnitude.

The microcomputer 50 (FIG. 3) removes any phase shifted current components in the sampled current profile, which is represented by curve 132, using a phase template, shown as curve 134 in FIG. 7, which represents the phase shifted components of the line current (curve 132). The microcomputer 50 (FIG. 3) generates the phase template (curve 134) in response to the zero crossing signal 53 (FIG. 3) indicating (at 128, FIG. 6) that the line voltage has reached 0 V. The phase template (curve 134) is then set equal to a sinusoidal current which has the fundamental frequency of the line current (curve 132) and a maximum amplitude that is equal to the amplitude of the line current (curve 132) when the line voltage is 0 V. The phase template (curve 134) is subtracted from the sampled current profile (curve 132) so that any phase shifted current component is removed, thereby leaving values for a zero-phase shifted sampled current profile (curve 136 shown in FIG. 7). Consequently, the conditioner circuitry 20 does not attempt to reduce any phase shift that is present between the line current and the line voltage and, thereby, avoids conducting the large currents that would otherwise be needed to correct the phase shifted current.

Also at step 130, shown in FIG. 6, each value in the zero-phase sampled current profile is subdivided into four values using interpolation between the values in the current profile. Subdividing each of the 256 sampled values into four interpolated values produces 1024 values for the current profile, enables the microcomputer 50 (FIG. 3) to remove harmonic current up to the 31st harmonic.

The operations between steps 138 and 146 adjust the range of operating voltages of the capacitor 84 (FIG. 3). The capacitor voltage is maintained above a predetermined minimum operating voltage to enable a sufficient discharge capacity to counteract a peak harmonic current. The capacitor voltage is also maintained below a predetermined maximum operating voltage that is related to the voltage rating of the capacitor 84. The capacitor voltage is typically maintained between about 200 V to 400 V when the normal RMS circuit branch line voltage is 110 V. As is further described below, the range of voltages for the capacitor 84 are controlled by varying which one of the family of desired current templates is used for comparison against the sampled current profile.

As shown at 138, an average magnitude of the sensed current is calculated from the values in the sampled current profile. A desired current template is selected from within the family of desired current templates which corresponds to the average magnitude of sensed current.

As shown at 140, when the capacitor voltage exceeds the high operating voltage for the capacitor 84 (FIG. 3), the next smaller magnitude desired current template is selected at 142. In contrast, at 144, when the capacitor voltage is less than the desired low operating voltage for capacitor 84 (FIG. 3), the next larger magnitude desired current template is selected at 146. In this manner, the operating voltage of the capacitor 84 (FIG. 3) is maintained within the predetermined range of voltages.

A pointer is set at step 148 to point to the first value in the sampled current profile. As shown in steps 150 to 160, each value in the sampled current profile is comparatively related with each corresponding value of the selected desired current template to generate an entry in the pulse width table. Initially, a determination is made at 150 as to whether the generation of the pulse width table has been completed for the present voltage cycle. Until the pulse width table is complete, values in the sampled current profile that are sequentially referenced by the pointer are compared to corresponding values in the desired current template. When the sampled current profile value is greater than the desired current template value (at 152), the entry in the pulse width table is decremented (at 154) to decrease the pulse width and cause the energy storage devices 60 (FIG. 3) to supply more current to the circuit branch 16. In contrast, when the entry in the sampled current profile is less than the entry in the desired current template (at 156), the entry in the pulse width table is incremented (at 158) to increase the pulse width and cause the energy storage devices 60 (FIG. 3) to draw more current from the circuit branch 16.

When the entry in the sampled current profile is substantially different from the entry in the desired current template, such as after power-up of the line conditioner 10 (FIG. 1), the pulse width table is incremented or decremented by more than one so as to rapidly reduce the magnitude of the harmonic current. Otherwise, the pulse width table entry is incremented or decremented by one to adapt, in a stable manner, to time-varying harmonic current.

In this manner, the circuitry 20 incrementally ramps-up or ramps-down the magnitude of current that is injected into the circuit branch 16 to adapt, on a cycle-by-cycle basis, to time-varying harmonic current. As shown at 160, the pointer is incremented to point to the next value in the sampled current profile.

In an alternate embodiment, the loop shown at 126 can be triggered by each half-cycle of voltage in the connected main power line 20 so that the circuitry 20 will incrementally ramp-up or ramp-down the magnitude of anti-harmonic current on a half cycle-by-half cycle basis.

To prevent the pulse width modulator 66 (FIG. 3) from using the pulse width table before it is completed, the table being generated is temporarily stored at a different memory location (e.g. within the microcomputer 50 or RAM 56, FIG. 3) from the previously completed pulse width table. When the pulse width table has been completed, the pulse width table is stored at 156 in the RAM 56 (FIG. 3). The main program flow 118 then returns to the beginning of the loop at 126 to synchronize the next adjustment to the pulse width table with the beginning of the next voltage cycle. Entries in the pulse width table are subsequently read by the pulse width modulator 66 (FIG. 3) from the RAM 56 to control the charging and discharging of the energy storage elements 60 (FIG. 3) to inject anti-harmonic currents into the circuit branch 16 (FIG. 3).

A presently preferred embodiment of a line conditioner 10 has been described that is connected to a power line through a conventional power outlet and in parallel with the nonlinear loads to which it responds. The line conditioner 10 senses harmonic currents in the power line and injects anti-harmonic currents into the power line to reduce or eliminate the harmonic currents. Connecting the line conditioner 10 in parallel with nonlinear loads has many advantages over power filters that are serially connected to nonlinear loads. For example, in contrast to serially connected power filters, the line conditioner 10 can be installed, turned off, or experience an operational failure without interrupting power to the nonlinear loads. In further contrast to serially connected power filters, the current drawn by the nonlinear loads does not necessarily flow through the line conditioner 10. Consequently, the line conditioner 10 is generally rated to handle a much lower current capacity than the sum of the peak currents drawn by the nonlinear loads, thereby decreasing cost while increasing reliability. Using the plug 24 to electrically connect the conditioner circuitry 20 to a conventional power outlet simplifies installation of the line conditioner 10 and enhances its portability. Furthermore, the capacity of the line conditioner 10 to reduce or eliminate harmonic currents can be easily scaled to meet changing requirements of a location, such as an office building, through the addition of line conditioners 10 to power outlets distributed throughout the location.

The presently preferred embodiment and its improvements have been described with a degree of particularity. This description has been made by way of preferred example. It should be understood that the scope of the present invention is defined by the following claims, and should not necessarily be limited by the detailed description of the preferred embodiment set forth above.

The invention claimed is:

1. An active power line conditioner for use with a power distribution system of the type in which positive and negative half-cycles of AC voltage and AC current are conducted in cycles in a single phase at a fundamental frequency on a power line, and an electrical load is connected to the power line and draws a harmonic frequency current at a harmonic frequency of the fundamental frequency, the active power line conditioner comprising:

a current sensor operative to sense the magnitude of current conducted on the power line and to supply a sensed current signal representative of the current sensed throughout each half-cycle of AC current conducted on the power line;

a template circuit supplying a current template which represents a pure sinusoidal current at the fundamental frequency;

a comparison circuit responsive to the current template and the sensed current signal to supply a comparison signal indicative of the relationship of sensed current signal relative to the current template at each of a plurality of intervals occurring during each half-cycle of AC current conducted on the power line;

a current absorption and supply circuit responsive to the comparison signal and operative during each of the intervals to absorb a predetermined amount of current from the power line in response to the comparison signal indicating that the sensed current is less than the current template and to supply a predetermined amount of current to the power line in response to the comparison signal indicating that the sensed current is greater than the current template, the predetermined amounts of current absorbed and supplied during each interval substantially canceling the harmonic frequency current component drawn by the load during each interval, and wherein the current absorption and supply circuit comprises an energy storage device which is charged with the current absorbed during each interval and which is discharged to supply the current supplied during each interval.

2. An active power line conditioner as defined in claim 1 wherein the energy storage device is charged and discharged during different intervals occurring during each one half-cycle of current conducted on the power line.

3. An active power line conditioner as defined in claim 1 wherein the energy storage device comprises a capacitor which is charged and discharged with current absorbed from and supplied to the power line, respectively, during each half-cycle.

4. An active power line conditioner as defined in claim 3 wherein the amount of current absorbed and the amount of current supplied by the capacitor during each half-cycle charges and discharges the capacitor between a predetermined maximum operating voltage and a predetermined minimum operating voltage.

5. An active power line conditioner as defined in claim 4 further comprising:
   a plurality of the aforesaid energy storage devices; and wherein:
   the current absorption and supply circuit absorbs current from and supplies current to the each of the energy storage devices in an interleaved, time-overlapping manner relative to at least one other energy storage device to increase the capacity for absorbing and supplying current beyond that of a single energy storage device.

6. An active power line conditioner as defined in claim 1 wherein the predetermined amounts of current absorbed and supplied are related to a magnitude of the comparison signal.

7. An active power line conditioner as defined in claim 6 wherein:
   the amounts of current absorbed and supplied are increased and decreased in predetermined increments on one of a cycle by cycle basis or a half-cycle by half-cycle basis to ramp up and ramp down the magnitude of the current absorbed and supplied sufficiently to cancel the harmonic frequency current component.

8. An active power line conditioner as defined in claim 1 wherein:
   digital values of the sensed current signal are sensed at each of the plurality of intervals;
   the current template comprises a plurality of digital values which represent the magnitude of the sinusoidal current at intervals corresponding to the intervals at which the digital values of the sensed current signal are derived;
   the template circuit selectively supplies a plurality of different current templates represented by digital values at the intervals at which the digital values of the sensed current signal are derived; and further comprising:
   an average value calculation circuit which responds to the digital values of the sensed current signal at the intervals and calculates an average magnitude of the sensed current from the digital values of the sensed current signal; and
   a selection circuit which selects one of the plurality of different current templates available from the template circuit which corresponds to the average magnitude of the sensed current, the selection circuit controlling the template circuit to supply the selected current template to the comparison circuit.

9. An active power line conditioner as defined in claim 8 wherein:
   the selection circuit controls the template circuit to increment and decrement the selected one of the plurality of different current templates on one of a cycle by cycle basis or a half-cycle by half-cycle basis to ramp up and ramp down the magnitude of the current absorbed and supplied sufficiently to cancel the harmonic frequency current component.

10. An active power line conditioner as defined in claim 1 wherein the cycles of AC voltage and current are phase shifted with respect to one another on the power line, and wherein:
    the template circuit phase shifts the current template to correspond with the phase shifted relationship of the sensed current; and
    the comparison circuit is responsive to the phase shifted current template and the sensed current signal to supply a comparison signal indicative of the relationship of sensed current signal relative to the phase shifted current template to avoid attempts to correct the phase shift of the AC current conducted in the power line relative to the AC voltage on the power line.

11. An active power line conditioner as defined in claim 1 further comprising:
    a bridge circuit connected between the power line and the energy storage device and responsive to the polarity of the half-cycles of voltage on the power line to connect the energy storage device to charge and discharge in a consistent relationship irrespective of the polarity of the half-cycle of voltage on the power line.

12. An active power line conditioner as defined in claim 1 wherein the current absorption and supply circuit further comprises a boost inverter circuit to charge the energy storage device.

13. An active power line conditioner as defined in claim 12 wherein the boost inverter circuit supplies voltage to the energy storage device of a magnitude greater than the voltage appearing on the power line.

14. An active power line conditioner as defined in claim 1 wherein the current absorption and supply circuit further comprises a buck converter circuit to discharge the energy storage device.

15. An active power line conditioner as defined in claim 14 wherein the buck converter circuit supplies a voltage to the power line which is less than the voltage appearing on the energy storage device.

16. An active power line conditioner as defined in claim 1 wherein the power distribution system further includes a plurality of power lines, each power line conducting a different phase of AC voltage and current, at least one power line having an electrical load connected thereto which creates a harmonic frequency current in that power line, the power distribution system further including a common neutral conductor for the plurality of power lines and a ground conductor, and wherein:
    the current sensor senses any current in the neutral conductor induced by any harmonic frequency current in any of the power lines; and
    the current absorption and supply circuit operates to absorb current from and supply current to the neutral line to cancel the harmonic frequency current collectively created in the neutral line by the electrical loads connected to each power line.

17. An active power line conditioner as defined in claim 1 wherein the power distribution system further includes a neutral line and a ground line in addition to the power line, and wherein the current sensor further comprises:
    a voltage sensor adapted to sense the voltage in the neutral line relative to the ground line as a representation of the harmonic frequency current.

18. An active power line conditioner as defined in claim 17 wherein the power distribution system further includes a conventional power outlet connected to the power, neutral and ground lines, and wherein:

the active power line conditioner further includes a conventional power plug adapted to be inserted into the power outlet to connect the active power line conditioner to the power line for operation.

19. A method of removing harmonic frequency components of current from a power line which supplies an electrical load, the power line receiving sequentially occurring alternating positive and negative half cycles of AC voltage and AC current in cycles at a fundamental frequency, the electrical load causing a harmonic frequency current in AC cycles of current supplied to the power line; said method comprising the steps of:

sensing the current conducted by the power line to the electrical load at each of a plurality of intervals occurring during each half-cycle of AC current conducted by the power line;

establishing a current template that represents a desired sinusoidal current to be conducted by the power line at the fundamental frequency at each of a plurality of intervals which correspond to the intervals at which the current is sensed;

comparing the sensed current to the current template at each of the predetermined intervals;

absorbing a predetermined amount of current from the power line at each of some intervals of each half-cycle in response to the comparison indicating that the sensed current is less than the current template;

supplying a predetermined amount of current to the power line at each of some other intervals of each half-cycle in response to the comparison indicating that the sensed current is greater than the current template;

the amounts of absorbed and supplied current fulfilling the harmonic frequency current requirement created by the load and substantially canceling the requirement for the power line to supply the harmonic frequency current component to the load;

charging an energy storage device with the current absorbed from the power line during each interval; and discharging the energy storage device to supply the current supplied to the power line during each interval.

20. A method as defined in claim 19 further comprising the step of:

charging and discharging the energy storage device during different intervals occurring during each half-cycle.

21. A method as defined in claim 19 further comprising the steps of:

utilizing a plurality of the aforesaid energy storage devices; and increasing the capacity for absorbing and supplying current by charging and discharging the plurality of energy storage devices in a time-overlapping, interleaved manner.

22. A method as defined in claim 19 further comprising the steps of:

ramping up and ramping down the magnitude of the supplied and absorbed current in predetermined incremental amounts in one of each consecutive cycle or half-cycle of current in the power line in which the comparison indicates that the sensed current is different from the current template, until the magnitude of the supplied and absorbed current substantially cancels the harmonic current.

23. A method as defined in claim 19 further comprising the step of:

selecting one of a plurality of different current templates for use in the comparison based on the magnitude of the sensed current.

24. A method as defined in claim 19 further comprising the steps of:

phase shifting the current template to correspond with any phase shift of the sensed AC current relative to the AC voltage on the power line;

comparing the phase shifted current template and the sensed current to avoid attempts to correct the phase shift of the AC current conducted in the power line relative to the AC voltage on the power line.

25. A method as defined in claim 19 further comprising the step of:

charging and discharging the energy storage device in a consistent relationship irrespective of the polarity of the half-cycle of voltage on the power line by conducting the absorbed and supplied current through a bridge circuit to the energy storage device.

26. A method as defined in claim 19 further comprising the step of:

charging the energy storage device through a boost inverter circuit.

27. A method as defined in claim 19 further comprising the step of:

discharging the energy storage device through a buck converter circuit.

28. A method as defined in claim 19 wherein the power line is one of a plurality of power lines, each power line conducts a different phase of AC voltage and AC current, one aforesaid electrical load is connected to at least one power line, a neutral conductor is associated with the plurality of power lines, and a ground conductor is associated with the power lines and the neutral conductor, said method further comprising the steps of:

sensing any current in the neutral conductor induced by any harmonic frequency current in any of the power lines; and absorbing current from and supplying current to the neutral line to cancel the harmonic frequency current collectively created in the neutral line by each electrical load connected to each power line.

* * * * *